United States Patent [19]

Nitzberg

[11] Patent Number: 5,014,732
[45] Date of Patent: May 14, 1991

[54] FLUID-JOINT BREAKAWAY SWIVEL COUPLING

[76] Inventor: Leonard R. Nitzberg, 1413 Buckeye La., Knoxville, Tenn. 37919

[21] Appl. No.: 517,909

[22] Filed: May 2, 1990

[51] Int. Cl.⁵ .................. F16K 17/40; F16L 37/28
[52] U.S. Cl. ..................... 137/68.1; 137/614.04; 285/2; 285/69; 285/272
[58] Field of Search ............. 137/68.1, 614.04; 285/1, 2, 3, 69, 272

[56] References Cited

U.S. PATENT DOCUMENTS

| | | | |
|---|---|---|---|
| 4,354,522 | 10/1982 | Bormioli | 285/1 X |
| 4,691,941 | 9/1987 | Rabushka et al. | 285/1 |
| 4,779,638 | 10/1988 | Nitzberg et al. | 137/68.1 |
| 4,791,961 | 12/1988 | Nitzberg et al. | 137/614.04 |
| 4,800,913 | 1/1989 | Nitzberg et al. | 137/68.1 |
| 4,827,961 | 5/1989 | Nitzberg et al. | 137/68.1 |
| 4,899,792 | 2/1990 | Podgers | 137/68.1 X |

Primary Examiner—John Rivell
Attorney, Agent, or Firm—Alan Ruderman

[57] ABSTRACT

A tensile force actuated fuel line swivel-joint quick-disconnecting coupling device has a pair of body members including interlocking elements which cooperatively couple and provide fuel passageways through the body members, and uncouple when a tensile force above a predetermined limit is interposed on the fuel line. The interlocking elements are in the form of a mortise and tenon connection and pivot one relative to the other about a swivel axis. A connecting member is pivotably connected to one of the body members and to a rigid conduit or fuel nozzle for rotation about a pivot axis. The other body member has a diverted fluid passageway including a longitudinal axis that extends to a port connected to a flexible fuel line. The pivot axis, the longitudinal axis and the swivel axis are disposed so that the longitudinal axis may align itself with the direction of any tensile force applied through the flexible fuel line. A containment member which prevents relative bending between the tenon and mortise prior to such alignment is interconnected with the interlocking elements and locked to the body member having the mortise by a frangible shear pin or an infrangible detent, unlocks the containment member from the body members and permits them to uncouple when the predetermined tensile force is exceeded. Valving is disposed within each body member so that when the body members uncouple respective valves close the flow passageway therein.

22 Claims, 4 Drawing Sheets

FLUID-JOINT BREAKAWAY SWIVEL COUPLING

BACKGROUND OF THE INVENTION

This invention relates to a fluid line swivel-joint connector having a quick-disconnectable coupling for uncoupling and shutting flow of the fluid through the line, and more particularly to a swivel joint connector for mounting in a fuel supply line of a fuel dispensing station for communicating a first fluid conduit rotatable about a first axis at one end to a second fluid conduit rotatable about a second axis at the other end so that a rigid conduit connected to one end may swivel relative to a flexible conduit connected to the other end, the connector having detachable means permitting uncoupling to shut flow communication at the joint when the tensile load at the joint is above a predetermined level, and being adapted to align the longitudinal axis of the end connected to the flexible conduit with the direction of any tensile force applied therethrough, the connector additionally having a releasable bearing member for supporting bending loads prior to alignment. The swivel joint may be mounted in a fuel line of a fuel dispensing station to permit a dispensing nozzle to pivot relatively to a fuel supplying hose, or it may permit the hose to pivot relatively to a rigid section of the fuel line.

It is known in the fuel dispensing art to include a swivel connector at the dispenser/hose interface so that twisting loads applied to the dispenser are not transmitted to the hose resulting in twisting thereof. Such swivels merely permit the dispenser, such as a fuel dispensing nozzle, to be pivoted about one or more axes relative to the axis of the hose, the swivel permitting flow communication means between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force in the line.

In U.S. Pat. No. 4,779,638 of Nitzberg et al, the problems and deficiencies of the prior art decoupler units was described including that of premature uncoupling, snap decoupling, and the cumulative affect of tensile force on the line and the hydrostatic forces of the liquid within the coupling, and combination swivel-joint and quick-disconnect coupling devices are disclosed that substantially overcome these problems. The devices there have coupling means between first and second body members which swivel relatively to one another and the coupling means normally acts to connect the body members in flow communication and to decouple when an external tensile force above a predetermined level is applied to the fuel line, and include valving acting for shutting flow communication when the body members are decoupled.

There are, however, certain occasions wherein the direction of the external tensile force applied to the fuel line is such that both in conventional swivel connectors and in the combination swivel-joint quick-disconnect couplings or connectors disclosed in the aforesaid U.S. Patent where the tensile force will not permit the swivel-joint to pivot, i.e, the reaction force to the external tensile force does not act in a direction which effects rotation about the pivot axis. Such conditions may occur when a swivel-joint having one end connected to a flexible fluid conduit, such as a hose, and another end connected to a rigid fluid conduit, such as a nozzle or rigidly mounted piping, does not permit the end connected to the flexible conduit to align itself with the direction in which the tensile force is applied. When this occurs a bending moment results which may act to shear the interconnecting members of the joint. For example, if the external tensile force is applied in the same plane as that of the pivot axis of the swivel joint and of the axes of the inlet and outlet to the swivel joint, the reaction to that force can only be resisted by the interconnecting members of the joint, and if the force is substantial a shearing of the elements may occur. In U.S. Pat. No. 4,791,961 of Nitzberg et al a swivel-joint coupling was disclosed which overcomes this problem by providing a two-axis swivel coupling having the longitudinal axis of the swivel joint and the end thereof connected to the flexible conduit offset relative to a plane parallel to one of the swivel axes and passing through the other so that the coupling could align the longitudinal axis of the end connected to the flexible conduit with the direction of any tensile force applied through the flexible conduit. Therefore, the longitudinal axis at the connecting member with the flexible conduit was disposed such that it is always offset from that plane which passes through the first swivel axis and is parallel to the second swivel axis.

Although, the apparatus of the aforesaid Nitzberg et al U.S Pat. No. 4,791,961 overcomes the problem of potential shearing of the interconnecting members of the joint so that the force applied to the flexible conduit is resisted without a reaction force tending to pull or pry apart the swivel connection by permitting alignment of the end connected to the flexible conduit with the direction in which the tensile force is applied, until such alignment occurs the interconnecting members resist the load. The interaction of the forces on the interconnecting members results in wear, and after a period of time the cumulative affect can result in breakage of the interconnecting elements.

SUMMARY OF THE INVENTION

Consequently, it is a primary object of the present invention to provide a two axis fluid swivel joint coupling having interconnected elements detachabley connected together for uncoupling when the tensile load at the joint is above a predetermined level, the interconnecting elements resisting bending loads applied at the joint.

It is another object of the present invention to provide a two axis swivel joint connector for mounting in a fluid supply line of a fuel dispensing station, the connector having interconnected elements pivotable about one of the axes and detachabley connected so as to uncouple when the tensile load at the joint is above a predetermined level, the interconnected elements providing a restraint resisting bending forces tending to pry the elements apart resulting when the tensile force is not in a direction or of a magnitude which initially effects rotation about the pivot axis.

It is a further object of the present invention to provide a two axis fluid swivel joint coupling having means at one end connected to a flexible conduit and means at another end connected to rigid conduit, the coupling being capable of aligning the longitudinal axis of the end connected to the flexible conduit with the direction of any tensile force applied through the flexible conduit, and having means for resisting bending loads resulting from the tensile force before such alignment occurs.

Accordingly, the present invention provides a two axis combination fluid swivel joint and quick disconnect coupling having a first body member including an inlet portal, an outlet portal and a diverted fluid passage therebetween. A connecting member is pivotably connected to and in flow communication with the first of the portals for rotation about a first swivel axis passing through the first portal and the first body member. A second body member is pivotably coupled to the first body member by interconnectable means so as to be in flow communication with the second of the portals and for rotation about a second swivel axis passing through the second portal and the first body member. The connecting member is operatively connected to a rigid conduit. The second body member has a diverted fluid passageway including a longitudinal axis extending through a third portal. The second body member is operatively connected to a flexible conduit with the third portal in flow communication therewith so that fluid may flow through the swivel joint between the rigid conduit and the flexible conduit. The interconnectable means decouples the body members when an external tensile force applied to the fluid line is above a predetermined level and valve means shuts flow communication between the body members when they are decoupled. The interconnecting means includes interconnectable portions of the first and second body members and a containment member interconnected and cooperating with the first and second body members.

A recouplable infrangible or replaceable frangible detent means normally secures the containment member to the body members and permits them to separate when the predetermined external load exerted on the line is exceeded. The infrangible detent means may comprise biased detent elements forced out of normally seated dispositions by the action of the exceeded tensile load, while the frangible means may merely be a breakaway member for permitting separation of the body members.

Preferably the longitudinal axis of the second body member is disposed relative to the first and second swivel axes such that the longitudinal axis is always offset from that plane which passes through the first swivel axis and is parallel to the second swivel axis, i.e., it is never in that plane, so that the longitudinal axis may align itself with the direction of any tensile force applied through the flexible conduit. The containment member acts in cooperation with the interconnecting portions of the first and second body members to resist bending loads resulting from the tensile force before such alignment occurs.

In the preferred form of the invention the interconnecting portions of the body members slideably mate and the containment member slideably mates with both body members, the detent means acting to releaseably secure them together. The slideable mating preferably is through an interconnecting joint such as a dado joint including interlocking members such as tongue and groove or tenon and mortise elements, the sliding plane being substantially aligned with the direction of the force vector of the externally impressed tensile force parallel to the longitudinal axis of the second body member.

The intended environment for the swivel joint coupling of the present invention is in the fuel dispensing line at a fuel dispensing station. Thus, the rigid conduit may be a fuel dispensing nozzle which would be connected to the connecting member at the outlet of the first body member and the flexible conduit would then be the fuel supply hose connected to the second body member at the inlet of the second body member, or alternatively, the rigid conduit may be rigid piping connected to the fuel system and anchored to structural framework at the station, the piping being connected to the connecting member at the inlet of the first body member and the second body member would then be connected to a coupling between a hose and the outlet of the second body member. In either instance the swivel joint is connected in the fuel line between the nozzle and a supply conduit which receives metered fuel from a remote location.

In the preferred embodiment of the invention the first swivel axis through the connecting member is offset from both the second swivel axis and the longitudinal axis of the second body member, and the second swivel axis is also offset from the longitudinal axis of the second body member so that the three axes never lie in the same plane. However, although the longitudinal axis of the second body member may lie in a plane with one of the other axes, the longitudinal axis of the second body member may not be in that plane through the first swivel axis which is parallel to the second swivel axis. This ensures that the coupling can align the longitudinal axis of the second body member with the direction of any tensile force applied through the flexible conduit, and the containment member ensures that the bending loads resulting from the tensile force before such alignment occurs is resisted without excessive wear on the interconnectable members.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
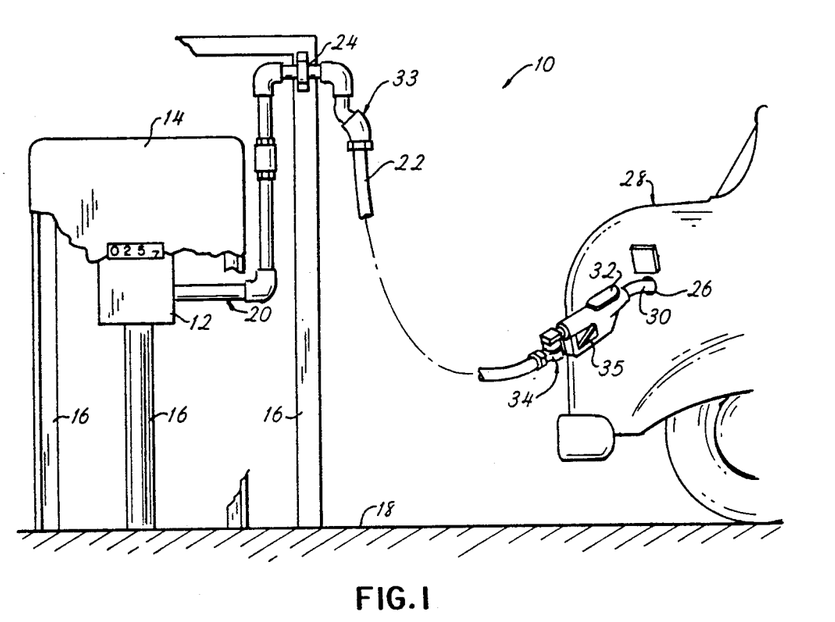
FIG. 1 is an elevational view of a portion of an automobile at a fuel dispensing station illustrating fuel being dispensed into the automobile from pumping apparatus having a fuel delivery line incorporating a swivel joint coupling constructed in accordance with the principles of the present invention.
Figure 2:
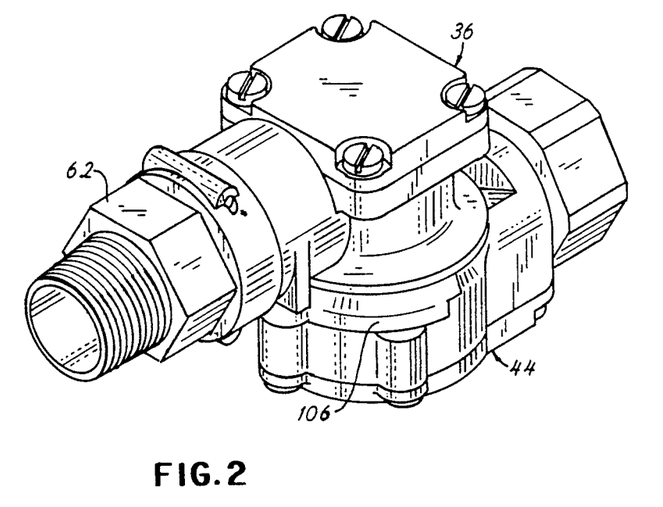
FIG. 2 is a perspective view of a swivel joint coupling constructed in accordance with the present invention.
Figure 3:
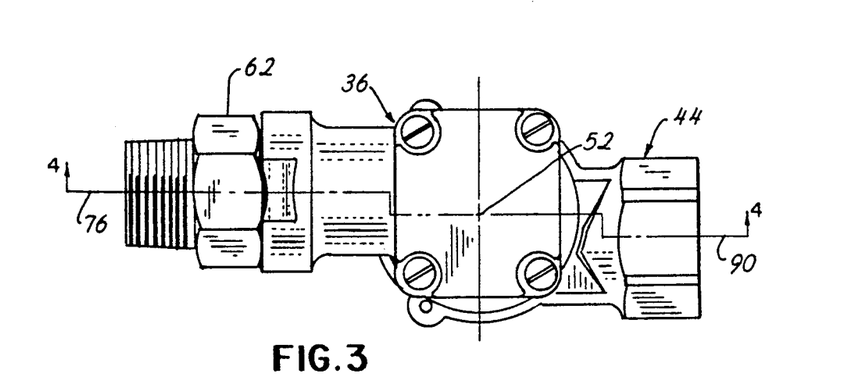
FIG. 3 is a top plan view of the swivel joint coupling.

Referring now to the drawings, a swivel joint coupling according to the present invention may be utilized in connection with fuel dispensing facilities of various types especially those dispensing stations which dispense gasoline and diesel fuel to the public. Although other applications may readily be envisioned, for disclosure purposes the present invention will be described in conjunction with fuel dispensing stations located at service stations. Thus, as illustrated in FIG. 1, a dispensing station generally indicated at 10 includes measuring apparatus 12 adapted to receive and measure pressurized fluid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced construction as approved by the appropriate regulatory bodies, and may be of any convenient size and length to permit an operator to easily reach the fuel tank inlet 26 of a vehicle 28 for insertion therein of the spout 30 at the end of a rigid dispensing nozzle 32, the nozzle being connected in flow communication with the hose 22 either directly or by means of a swivel joint connector, which preferably may be a swivel joint connector or coupling 34 constructed in accordance with the principles of the present invention. Alternatively, the swivel joint connector 34 may be placed between the hose and the rigid piping, such as at 33. However, for purposes of describing the invention, the coupling 34 is disclosed as between the rigid nozzle 32 and the hose 22, the hose being a flexible conduit. Conventionally, the nozzle includes valving in the fluid passageway in the body thereof, the valving being controlled by an adjustment trigger 35 biased to close the valving and operable to open the flow passageway upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. When the dispensing operation is completed, the individual is expected to remove the nozzle spout from the fuel tank inlet, turn off the pumping equipment and replace the nozzle on the cabinet. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reasons, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated at the nozzle being tensile forces which are transmitted through the hose 22 to the piping and resisted by the anchoring means 24. However, when such forces exceed that for which the anchoring means is capable of withstanding, damage to the measuring equipment 12 as well as the various components of the piping may result. Additionally, when such damage occurs the highly combustible fuel may be spilled resulting in a potential fire hazard and additional environmental hazards.

Described in the aforesaid Nitzberg et al U.S. Pat. No. 4,779,638 is a combination swivel joint and quick disconnect device which may be interposed between the hose 22 and the nozzle 32 thereby serving as a detachable and flexible nozzle swivel, or alternatively it may be interposed between various sections of the hose or between the piping and the hose to thereby serve as a detachable and flexible hose swivel. However, as with conventional swivel couplings, the detachable swivel device disclosed in that patent may not function as a swivel when the direction of application of the tensile force prevents pivoting of the components about the pivot axes. This can occur when the swivel joint connector will not permit the end connected to the hose to align itself with the direction in which the tensile force is applied. When this occurs a bending moment results and if the tensile force is sufficient a shearing of the interconnecting swivel members of the joint can result. This problem was addressed by the device disclosed in the aforesaid Nitzberg et al U.S. Pat. No. 4,791,961 wherein at least the longitudinal axis of that portion of the swivel joint which is connected to the hose (or other flexible conduit) is always offset from the one plane which passes through the first swivel axis of the first body member and the connecting member attached to the nozzle (or other rigid conduit) parallel to the other swivel axis. This permits the coupling to align the longitudinal axis with the direction of any tensile force applied through the hose. However, wear results at the interface between the first and second body members until such alignment occurs, or if the force is insufficient to effect such alignment. Eventually the resultant wear can cause failure of the interconnection between the first and second body members. The present invention overcomes this problem.

As illustrated in the drawings, the preferred form of the detachable swivel coupling 34 comprises a first body member 36 defining a fluid passageway 38 therein, the passageway 38 having a portal 40, which, in the preferred embodiment, is an inlet and a portal 42 which is herein an outlet. The detachable swivel additionally includes a second body member 44 defining a fluid passageway 46 therein which communicates fluid from a portal 48 forming an inlet to a portal 50 herein forming an outlet. As hereinafter described, the outlet portal 50 of the second body member 44 is mounted in flow communication with the inlet 40 of the first body member 36 by means of a pivotable connection such that the body members 36 and 44 may swivel or rotate relative to each other about a pivot or swivel axis 52. The inlet 48 is adapted to be connected by conventional means such as threads 54 in flow communication with a conduit member which may be a coupling (not illustrated) attached to the hose 22. One or more fluid seals such as a quad-Vee seal 56 and an "O" ring seal 58 suitable for maintaining flow communication between the outlet 50 of the body member 44 and the inlet 40 of the body member 36 may be provided as hereinafter described when the body members are in the coupled or operative disposition to preclude leakage as the body members 36 and 44 rotate relative to one another.

The outlet 42 of the first body member 36 is disposed internally within an annular extension or annulus 60 formed at the exit end of the body member 36, and is connected to a coupling 62 for communicating the fluid fuel therethrough, the connection between the coupling 62 and the first body member 36 being by means of a second swivel joint. For example, as preferred, the coupling 62 is a male member for connection to the nozzle 32 or to the rigid piping and is received within the annulus 60 and rotatably connected thereto by means of an annular retainer member 64 disposed about a peripheral portion 66 of the coupling 62 within a step portion or recess 68 of the annulus 60. A flexible rod 70 formed from a nylon material such as Delrin is received through an opening 72 in the retainer 64 and coiled about the coupling 62 and positioned in a seat 74 within the retainer so that the coupling may rotate relative to the retainer and the body member about another swivel axis 76. A pair of spring pins 78 extend through the external wall of the annulus and corresponding slots 80 on the periphery of the retaining member to preclude rotation of the retaining member, and a pair of fluid seals such as "O" rings 82 preclude leakage as the body member 36 and the coupling swivel or rotate relative to each other about the swivel axis 76. A wave spring 84 acts between the body member 36 and a flange 85 of the coupling to urge them apart axially. Thus, the inlet portal 48 of the body member 44 and the outlet portal 86 of the coupling 62 may revolve in two planes relative to each other about the respective axis of rotation 52 and 76, these axes being inclined substantially normal and preferably offset relative to each other. The outlet section of the coupling 62 is adapted, by conventional means such as threads 88, to be connected in flow communication with a rigid conduit, or preferably, directly to the inlet of the nozzle 32 as illustrated in FIG. 1.

The fluid passageway 38 in the body member 36 is diverted in direction from the axis 76 through the outlet portal 86 to the portal 40 preferably by 90°. Additionally, the fluid passageway 46 through the second body member 44 is diverted from the direction of fluid flow between the first body member 36 substantially along the axis 52 to a direction extending in a line of flow along a longitudinal axis 90 through the inlet portal 48, this being the direction of fluid flow through the flexible hose at the connection with the second body member 44. Thus, both the first body member 36 and the second body member 44 have diverted passageways 38, 46 respectively which change the direction of flow through the swivel joint, the passageway 38 acting to change the flow direction from that coincidental with the swivel axis 76 to that coincidental with the swivel axis 52, while the passageway 46 changes the direction of flow in the body member 44 from that coincidental with the longitudinal axis 90 to a direction coincidental with the swivel axis 52. Furthermore, as described in detail in aforesaid U.S. Pat. No. 4,791,961, the axis 90 is never in the plane through the axis 76 which is parallel to the axis 52. It is either parallel to that plane, will intersect that plane, or is skewed relative to that plane. Although in the illustrated instance that plane is offset from the axis 52, it need not be for the swivel joint coupling to align the axis 90 with the direction of any tensile force applied through the hose 22, as long as the above criteria applies.

Figure 5:
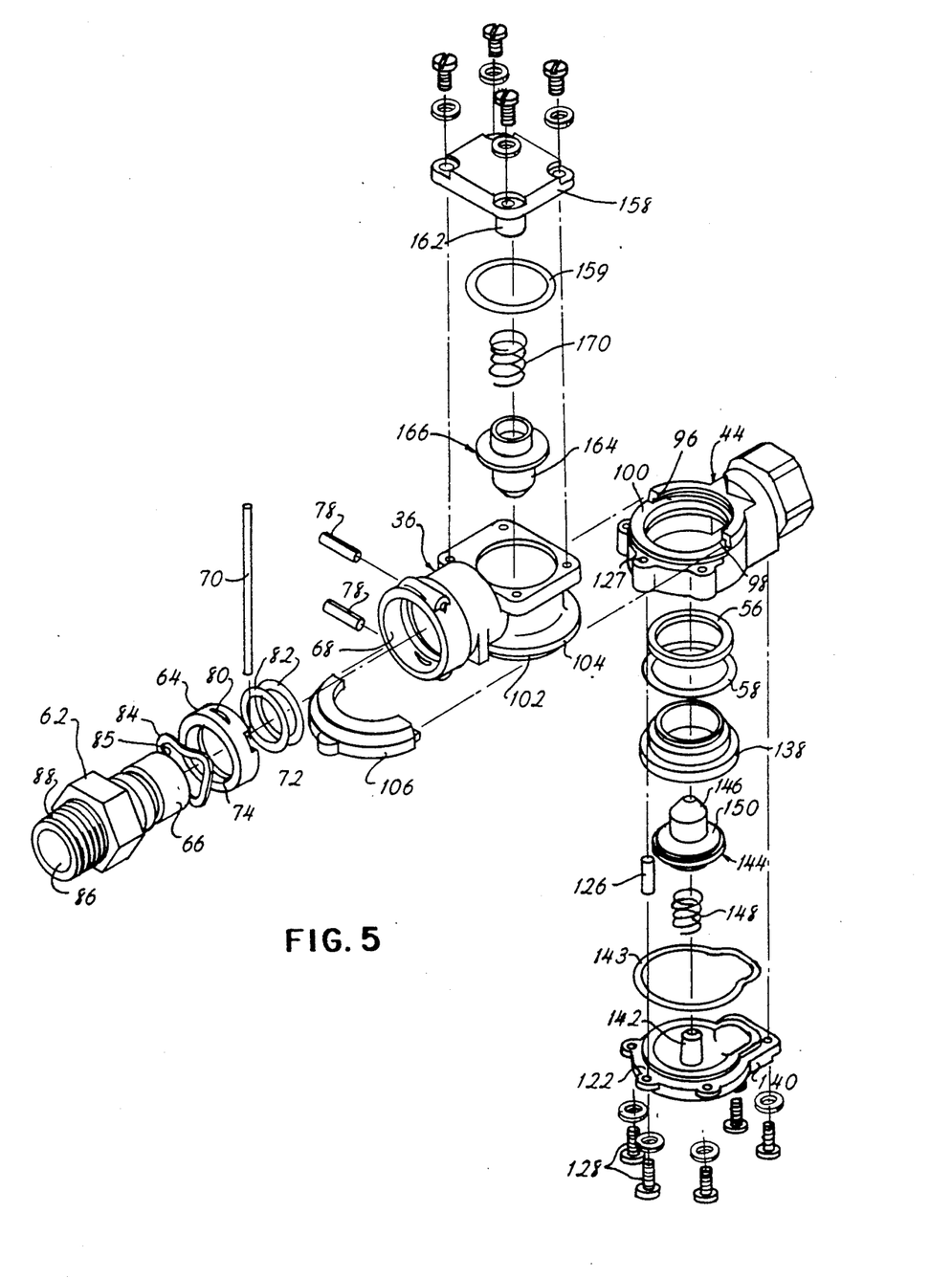
FIG. 5 is an exploded view of the swivel joint connector illustrated in FIG. 4.
Figure 7:
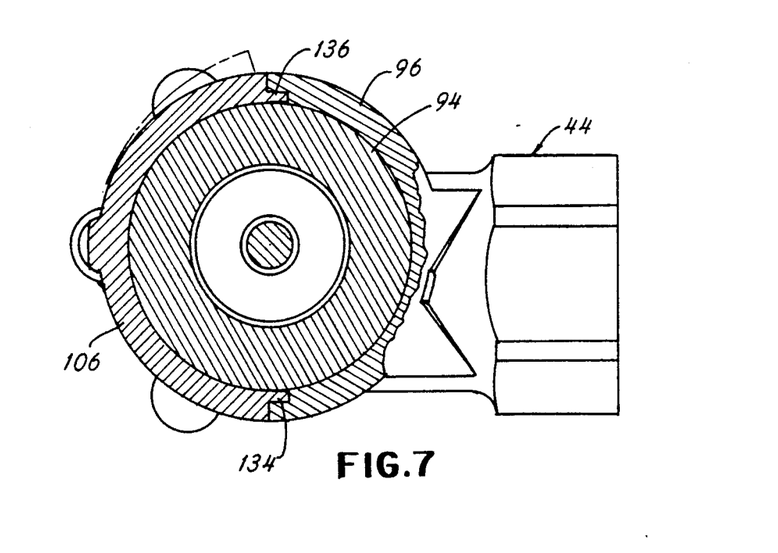
FIG. 7 is a cross sectional view taken substantially along line 7—7 of FIG. 4.

In order to couple the first and second body members 36, 34 together in flow communication and to uncouple them when an extraneous force in excess of a predetermined level is applied so as to terminate flow communication, interconnectable means generally indicated at 92 is provided, such means permitting the body members to rotate relative to each other about the axis 52 when coupled and to forcibly uncouple by sliding apart due to the extraneous tensile force vector applied between the coupling and the second body member along the line of action extending along the axes 76 and 90. The interconnectable means 92 comprises interlocking members 94 and 96 formed on the first and second body members 36, 44 respectively. These interlocking members are constructed in a mortise and tenon fashion in the sense that the member 94 is received within a dado slot 98 formed in step fashion between the member 96 and a surface 100 of the body member 44, the member 94 having a surface 102 spaced from a ledge 104 formed on the body member 36, and the member 96 is received within the space between the surface 102 and the ledge 104. As illustrated in FIGS. 5 and 7, the interlocking member 96 is an arcuate substantially semi-circular segment formed about the axis 52 at the fluid outlet 50 of the body member 44. The interlocking member 94 is a circular annular segment formed about the fluid inlet 40 in the body member 36, the center of the annulus being the axis 52 when the first and second body members are coupled. The interlocking members 94 and 96 thus have corresponding surfaces which interface together when the first and second body members are slidably juxtaposed into coupling engagement, and may rotate relative to one another when so coupled.

Figure 4:
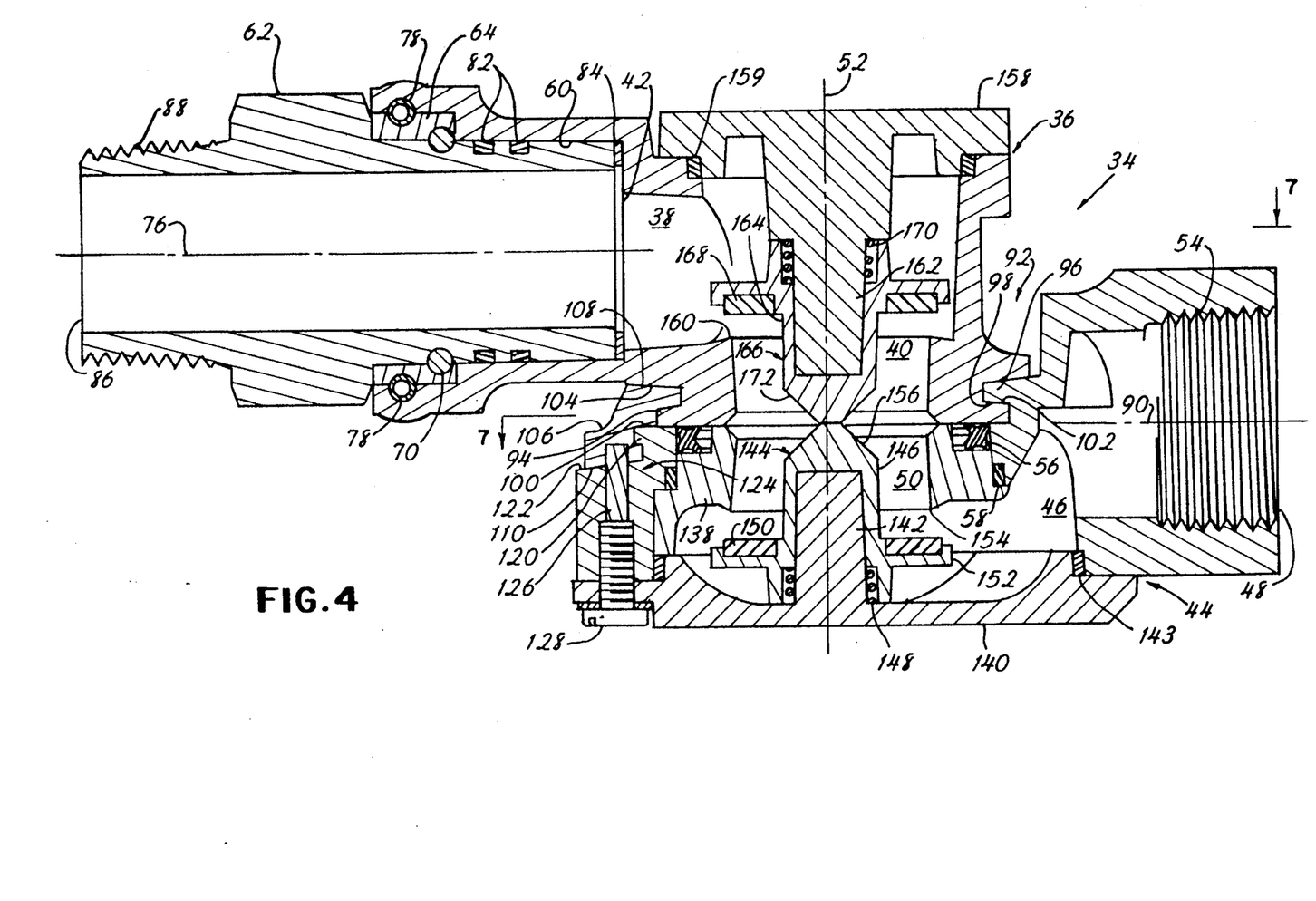
FIG. 4 is a cross sectional view taken substantially along line 4—4 of FIG. 3 of a first embodiment of the swivel joint coupling.
Figure 6:
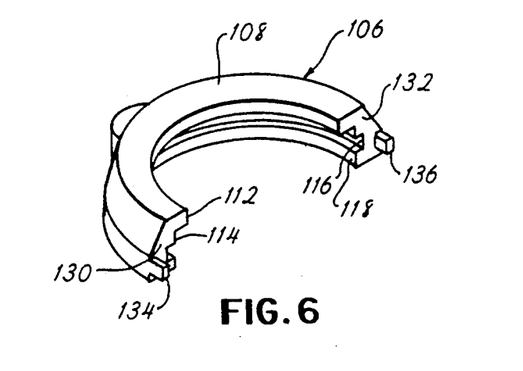
FIG. 6 is a perspective view illustrating the containment member.

In accordance with the present invention a containment member 106 substantially in the form of a U-shape or semi-circular annular member is slidably receivable in the space between the opening remaining between the body members 36 and 44 when coupled. As best illustrated in FIGS. 4 and 6, the containment member 106 has a pair of surfaces 108, 110 spaced apart by means of an inwardly extending peripheral lip 112 adjacent the surface 108, a ledge 114 stepped inwardly relative to the lip 112, another ledge 116 stepped radially outwardly relative to the lip 112 and the ledge 114, and another lip 118 stepped inwardly relative to the ledge 116. The lip 112 is receivable within the space between the surface 102 and the ledge 104 of the body member 36 with the surface 108 abutting the ledge 104. The ledge 114 is adopted to abut the periphery of the rim 102. A rim 120 is formed on the body member 44 spaced above and inwardly of a shelf 122 which is undercut so that the rim 120 overlays a portion of the shelf. The rim 120 is receivable within the space defined by the steps forming the ledge 116 so that the periphery of the rim 120 abuts the ledge 116. The surface 110 of the containment member 106 is disposed on the shelf 122, as illustrated in FIG. 4, with the lip 118 positioned within the undercut between the shelf 122 and the rim 120. Thus, the containment member fills the void left after the interlocking member 94 is received within the dado slot 98 to preclude the body members from bending about the axis 52 relative to each other until alignment of the longitudinal axis 76 with the direction of the tensile through the hose 22 occurs.

In order to secure the containment member in place until a predetermined tensile force vector is applied along the separation plane between the interconnectable means 92, the present invention includes detent means 124 which in the preferred embodiment comprises a frangible shear pin 126. The shear pin extends through a bore 127 illustrated in FIG. 5 formed in the body member 44 and is received within a recess in the surface 110 of the containment member 106. A self tapping screw 128 is threaded through the body member 44, as hereinafter described, and abuts the shear pin 126 to hold it in the recess within the containment member 106 to secure the containment member to the body members 36 and 44 until the pin 126 is sheared as a result of an excessive tensile force.

Since the containment member 106 is a bearing member, it is formed from a bearing material such as a zinc alloy. Thus, in order to preclude the free end limbs 130, 132 of the containment member from expanding outwardly and losing its shape after substantially use, a respective finger 134, 136 extends from the limbs 130, 132. The fingers 134, 136 are positionable within the facing portions of the dado slot 98 when the containment member is connected to the body members 36 and 44, and prevents the containment member from turning or twisting about the shear pin 126 which action would result in excessive wear and outward expansion of the limbs 130, 132.

Valving is provided in each of the body members 36, 44, which valving is disposed to maintain the portals 40, 50 in flow communication with each other when the members 36 and 44 are coupled together, yet close the respective passageways when the body members are uncoupled. A valve seat member 138 is disposed in the passageway 46 in the body member 44, the valve seat in actuality forming the portal 50 and capturing the seals 56 and 58 in conjunction with the remainder of the body portion 44. A cap 140 having a guide spindle 142 extending substantially along the axis 52 is secured to the body member 44 by a number of screws such as and including the screw 128, a gasket 143 acting between the cap and the body member 44. A check valve 144 having an integral hollow stem 146 receives the spindle 142 and is movable along the axis 52 guided by the spindle 142, while a coil spring 148 acts to bias the check valve 144 toward the portal 50. An annular elastomeric check valve seat 150 is bonded to and disposed about an annular web 152 of the check valve 144 and when the body members are disconnected the check valve seat 150 is forced into cooperation with an annular seat 154 on the valve seat member 138 to close the portal 50. When this occurs the free end 156 of the valve stem 146 projects out the portal 50.

Similar valving structure is disposed within the passageway 38 of the body member 36 for closing the portal 40 therein when the body members 36 and 44 uncouple. Here, the shape of the cap 158 and the gasket 159 are different from the cap 140 and gasket 143, and the annular seat 160 is formed integral with the body member 36, but in all other respects the valving is the same. Thus, the cap 158 has a guide spindle 162 which guides the hollow stem 164 of a check valve 166 identical to the check valve 144. A valve seat 168 is forced into cooperation with the seat 160 by the urging of a spring 170 when the body members uncouple, and the free end 172 of the stem 164 projects out of the portal 40. When the members are coupled together the free end 156, 172 of the valve stems 146, 164 respectively are forcibly engaged to overcome the bias of the respective spring 148, 170 and open the flow path through the portals 40, 50.

Figure 8:
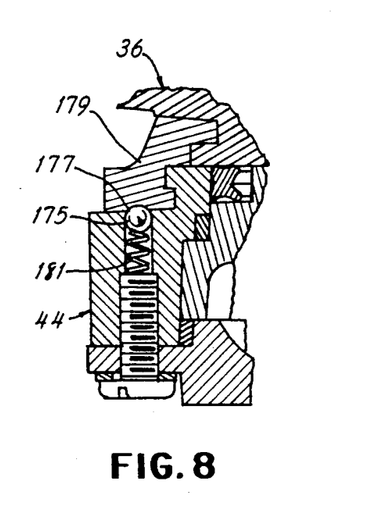
FIG. 8 is a fragmentary cross sectional view of a portion of another embodiment of the invention wherein the containment member is recoupleable with the body members after uncoupling has occurred.

Illustrated in FIG. 8 is a modification of the detent of the first embodiment. Here rather than a frangible detent such as the shear pin 126, there is an infrangible detent comprising a ball 175 urged into a shallow recess 177 in a containment member 179 identical to the containment member 106 except for the depth of the recess. One end of a coil spring 181 is upset about a portion of the ball and urges the ball 175 into the recess, the spring 181 abutting the screw 128 at its other end. When the shearing action of the tensile force overcomes the urging of the spring 181, the ball 175 is forced out of the recess 177 and the containment member is released to uncouple the body members 36, 44. The advantage of this embodiment is that if permitted by regulatory authorities, the body members together with the containment member may be recoupled in the field.

Accordingly, quick disconnect and swivel joint apparatus is provided which fulfills the objects stated. The containment member provided by the present invention ensures that excessive wear on the intrconnectible members of the body members 36 and 44 do not occur so that the parts do not fail prematurely. This ensures that uncoupling of the body members does not result except when the predetermined tensile force in the shear plane is encountered.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

1. In a fuel dispensing system including a liquid fuel dispensing station for receiving fuel from a remote location and supplying fuel to a rigid supply conduit, a flexible fuel line operatively connected in flow communication to said conduit, and a nozzle including operator actuating means operatively connected to said fuel line, a detachable safety device connected in said fuel line intermediate said nozzle and said conduit for coupling portions of said line together and for uncoupling when an excessive tensile force is exerted externally on said fuel line, said device comprising first and second body members, each of said body members having a diverted fluid passageway extending therethrough, each of said passageways having an outlet and an inlet, coupling means interconnecting said first and second body members together for pivotable movement about a swivel axis relative to one another with the outlet of said first body member in flow communication with the inlet of said second body member to permit fuel to flow therethrough when said body members are coupled, said coupling means having respective interlocking elements associated with each body member permitting sliding of said body members relatively to one another into and out of coupling engagement in a direction inclined relative to said swivel axis, said interlocking elements comprising a first interlocking member disposed about the outlet of said first body member and a second interlocking member disposed about the inlet of said second body member, an arcuate mortise slot formed in one of said interlocking members and an arcuate tenon defined in the other of said interlocking members having a portion cooperatively received within said mortise when said body members are coupled, a containment member having a configuration complementing said tenon for receiving the remaining portion of said tenon and including finger means receivable within said mortise slot when said body members are coupled to minimize relative bending between said mortise and said tenon, locking means for locking said containment member together with said interlocking members when said body members are coupled and for unlocking said containment member from said interlocking members when said external tensile force above a predetermined limit is applied to said fuel line to release said containment member and permit uncoupling of said body members, and valve means in the fluid passageway of each body member for shutting flow communication between said body members when uncoupled.

2. In a fuel dispensing system as recited in claim 1, wherein said tenon is a circular circumference and said mortise slot has a substantially semi-circular cross sectional configuration, and said locking means comprising a detent interconnecting said containment member to the body member having said mortise slot.

3. In a fuel dispensing system as recited in claim 2, wherein said detent comprises a frangible shear pin disposed within said containment member and said body member having said mortise slot.

4. In a fuel dispensing system as recited in claim 1, wherein said body member having said mortise slot includes a rim, and said containment member has a slot for receiving said rim.

5. In a fuel dispensing system as recited in claim 4, wherein said containment member includes finger means receivable within said mortise slot.

6. In a fuel dispensing system as recited in claim 1, wherein said detent includes a recess formed in said containment member, a ball adapted to be positioned in said recess, and spring means disposed within the body member having said mortise slot for urging said ball into said recess.

7. In a fuel dispensing system as recited in claim 1, including a connecting member pivotably connected to the inlet of said first body member for rotation about a pivot axis passing through the first body member and the inlet of said first body member, means for connecting said connecting member to said rigid conduit, the diverted passageway of said second body member including a longitudinal axis extending through the outlet of said second body member, means for connecting said second body member to said flexible fuel line with the outlet of said second body member in flow communication therewith so that fuel may flow through said body members from said rigid conduit to said flexible fuel line, said longitudinal axis being disposed relative to said swivel axis and said pivot axis such that said longitudinal axis is never in that plane which passes through said pivot axis and is parallel to said swivel axis.

8. In a fuel dispensing system as recited in claim 7, wherein said diverted passageway in said first body member comprises a passageway offset relatively to said pivot axis in a plane normal to said pivot axis and offset relatively to said pivot axis in a plane parallel to said pivot and swivel axes.

9. In a fuel dispensing system as recited in claim 7, wherein said diverted fluid passageway in said second body member comprises a passageway offset relatively to said longitudinal axis in a plane normal to said longitudinal axis and offset relatively to said longitudinal axis in a plane parallel to said longitudinal axis and said swivel axis.

10. In a fuel dispensing system as recited in claim 8, wherein said diverted fluid passageway in said second body member comprises a passageway offset relatively to said longitudinal axis in a plane normal to said longitudinal axis and offset relatively to said longitudinal axis in a plane parallel to said longitudinal axis and said swivel axis.

11. In a fuel dispensing system as recited in claim 1, including a connecting member pivotably connected to the outlet of said second body member for rotation about a pivot axis passing through the second body member and the outlet of said second body member, means for connecting said connecting member to said nozzle, the diverted passageway of said first body member including a longitudinal axis extending through the inlet of said first body member, means for connecting said first body member to said flexible fuel line with the inlet of said first body member in flow communication therewith so fuel may flow through said body members from said flexible fuel line to said nozzle, said longitudinal axis being disposed relative to said swivel axis and said pivot axis such that said longitudinal axis is never in that plane which passes through said pivot axis and is parallel to said swivel axis.

12. In a fuel dispensing system as recited in claim 11, wherein said diverted passageway in said first body member comprises a passageway offset relatively to said swivel axis in a plane normal to said swivel axis and offset relatively to said swivel axis in a plane parallel to said swivel and longitudinal axes.

13. In a fuel dispensing system as recited in claim 11, wherein said diverted fluid passageway in said second body member comprises a passageway offset relatively to said longitudinal axis in a plane normal to said pivot axis and offset relatively to said pivot axis in a plane parallel to said swivel axis and said pivot axis.

14. In a fuel dispensing system as recited in claim 12, wherein said diverted fluid passageway in said second body member comprises a passageway offset relatively to said longitudinal axis in a plane normal to said pivot axis and offset relatively to said pivot axis in a plane parallel to said swivel axis and said pivot axis.

15. In a fuel dispensing system as recited in claim 7, wherein said pivot axis is offset from said swivel axis.

16. In a fuel dispensing system as recited in claim 7, wherein said longitudinal axis is offset from said swivel axis.

17. In a fuel dispensing system as recited in claim 7, wherein said pivot axis and said longitudinal axis are offset from said swivel axis and from each other.

18. In a fuel dispensing system as recited in claim 11, wherein said pivot axis is offset from said swivel axis.

19. In a fuel dispensing system as recited in claim 11, wherein said longitudinal axis is offset from said swivel axis.

20. In a fuel dispensing system as recited in claim 11, wherein said pivot axis and said longitudinal axis are offset from said swivel axis and from each other.

21. In a fuel dispensing system as recited in claim 1, including a connecting member pivotably connected to the inlet of said first body member for rotation about a pivot axis passing through the first body member and the inlet of said first body member, means for connecting said connecting member to said rigid conduit, the diverted passageway of said second body member including a longitudinal axis extending through the outlet of said second body member, means for connecting said second body member to said flexible fuel line with the outlet of said second body member in flow communication therewith so that fuel may flow through said body members from said rigid conduit to said flexible fuel line, said longitudinal axis being disposed relative to said swivel axis and said pivot axis such that said longitudinal axis is never in that plane which passes through said pivot axis and is parallel to said swivel axis.

22. In a fuel dispensing system as recited in claim 2, including a connecting member pivotably connected to the outlet of said second body member for rotation about a pivot axis passing through the second body member and the outlet of said second body member, means for connecting said connecting member to said nozzle, the diverted passageway of said first body member including a longitudinal axis extending through the inlet of said first body member, means for connecting said first body member to said flexible fuel line with the inlet of said first body member in flow communication therewith so fuel may flow through said body members from said flexible fuel line to said nozzle, said longitudinal axis being disposed relative to said swivel axis and said pivot axis such that said longitudinal axis is never in that plane which passes through said pivot axis and is parallel to said swivel axis.

* * * * *